Feb. 5, 1963

E. CHUSID ET AL 3,076,527

CHECKING SYSTEM

Filed March 12, 1959

Feb. 5, 1963  E. CHUSID ET AL  3,076,527
CHECKING SYSTEM
Filed March 12, 1959  3 Sheets-Sheet 2

United States Patent Office 3,076,527
Patented Feb. 5, 1963

3,076,527
CHECKING SYSTEM
Edward Chusid, 19342 Washburn Ave., Detroit, Mich.;
Jonnard Greenberg, 23880 Norwood Ave., Oak Park,
Mich.; and Robert H. Knowles, 31999 Rocky Crest
Drive, Farmington, Mich.
Filed Mar. 12, 1959, Ser. No. 798,962
11 Claims. (Cl. 186—1)

The present invention relates to a checking system and to a portable cart particularly useful therefor. The invention is specially useful in large self-service retail operations, such as food markets where the customers select the articles of merchandise desired to be purchased, load them into a portable cart, and transport them to the check stand or counter where the checker, usually the cashier, lists the articles in the cash register.

The modern self-service markets require an efficient system and equipment for speedily handling the customers as they line up in front of the check counter. With the equipment in use today, the customer must ordinarily unload the cart himself onto the check counter, whereupon the cashier actuates a conveyer means of any one of a number of types built into the counter for conveying the items to a location conveniently accessible to her within a relatively narrow area of reach while she checks each item and enters its price into the cash register.

An object of the present invention is to provide an improved checking system which does not require any manual unloading of the cart by the customer, but which permits efficient unloading by the cashier as she checks each item and enters its price into the cash register. The system thereby not only relieves the customer from unloading the cart but also reduces the total times required in handling each customer's purchases. Also, this system is more reliable in that there is less likelihood of the cashieer inadvertently neglecting to list an item in the cash register if she actually lifts it from the cart.

A more particular object of the invention is to provide a checking system which will permit the customer to merely wheel his loaded cart to a specific position with respect to the counter, and which will thereupon permit the cashier to efficiently unload the cart by actuating the cart basket, or parts thereof, to position each item within a relatively narrow area of reach. In this manner, the cashier can conveniently with one hand, remove the items from the cart as they are successively positioned at substantially the same location, while she lists their amounts with the other hand.

A further object of the invention is to provide a novel cart constructed in a manner so that its article-carrying basket, or parts thereof, may be automatically actuated under control of an operator so that it moves the articles contained therein to a position permitting more convenient and efficient removal from the basket.

In accordance with the invention, there is provided a check counter or stand and a portable cart. The portable cart includes a wheeled frame structure and a basket supported thereby for carrying the articles of merchandise, which basket includes a preferably cylindrical side wall, a preferably circular bottom wall and an open top, the bottom wall being supported to permit relative vertical movement thereof with respect to the side wall in a direction bringing the bottom wall towards and away from the open top. There is also provided drive means, preferably enclosed within the counter, engageable with the basket bottom wall for moving same vertically with respect to the side wall. Also, further means are provided, preferably by the counter structure, for properly positioning the portable cart with respect to the counter and the drive means.

According to the other aspects of the invention, the bottom wall of the basket is also supported to permit relative horizonatl rotationtal movment thereof with respect to the cart frame structure. The rotational movement of the bottom wall may be effected by the drive means or manually, and may cause only the bottom wall to move with respect to the cart frame structure or may cause the whole basket to rotate as a unit with respect to the frame structure. A number of arrangements are disclosed. In any event, the articles of merchandise carried in the basket may thereby be successively positioned within a relatively narrow area of reach, so that the customer need only wheel his cart to a specific position with respect to the counter, whereupon the cashier will be able to speedily and efficiently unload the cart as she checks each item and lists it in the cash register.

Other aspects of the invention pertain to the cart structure to enable each cart to be nested or telescoped into the other carts of like structure so that during their non-use they will occupy a minimum of floor space.

Still other features and advantages of the invention will become apparent by reference to the following description of several preferred embodiments constructed in accordance with the invention.

Figure 1:
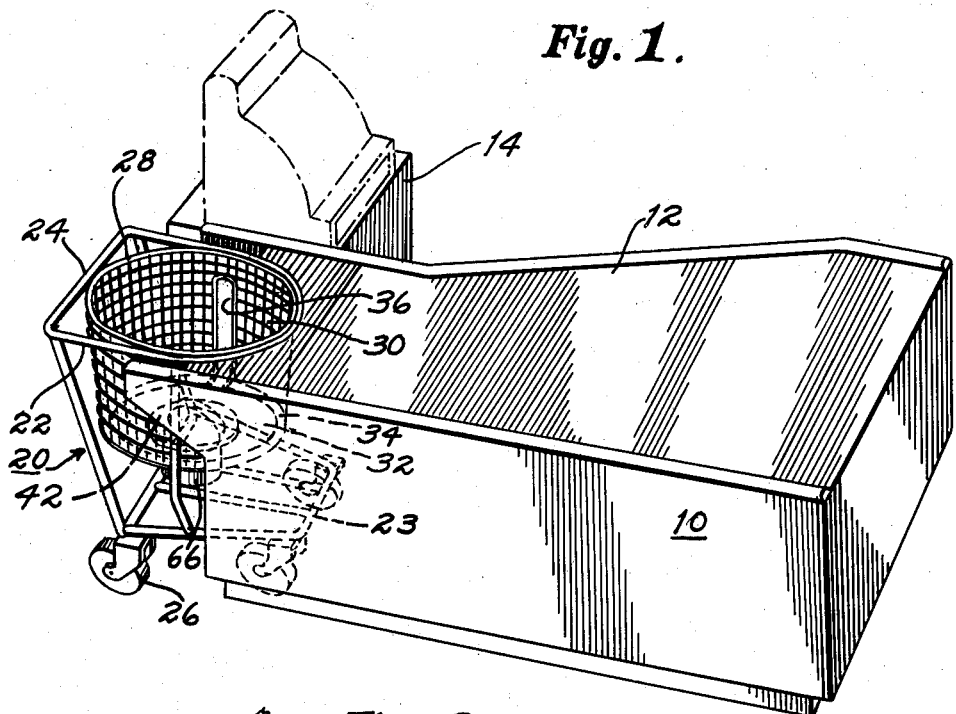
FIG. 1 is a perspective view of the checking system illustrating the check counter and portable cart in proper position with respect thereto.
Figure 2:
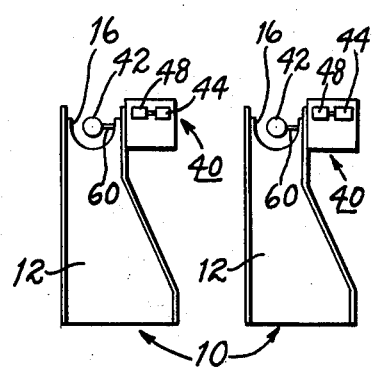
FIG. 2 is an illustration, from above, of a typical arrangement including the check counters without the portable carts.

Referring to FIGS. 1 and 2, the checking system includes a counter generally designated as 10 which may be of any conventional construction and which is provided with a flat table surface 12 for checking and packaging the merchandise as it is unloaded from the cart. The counter also includes a stand 14 for supporting the cash register. The stand may be integral with the counter or a separate unit, but in either event it is considered part of the counter for purposes of this description.

The terminal portion of the counter 12 adjacent to where the cashier would be located is used to position the portable cart, generally designated as 20, in a predetermined position with respect to the cashier and the drive mechanism to be described cooperable with the cart. This portion of the counter is therefore provided with a semi-circular recess 16 for the reception of the cart. During a checking operation, the customer would wheel the cart into this recess, whereupon the cashier would unload it by actuating same in the manner to be described.

Figure 4:
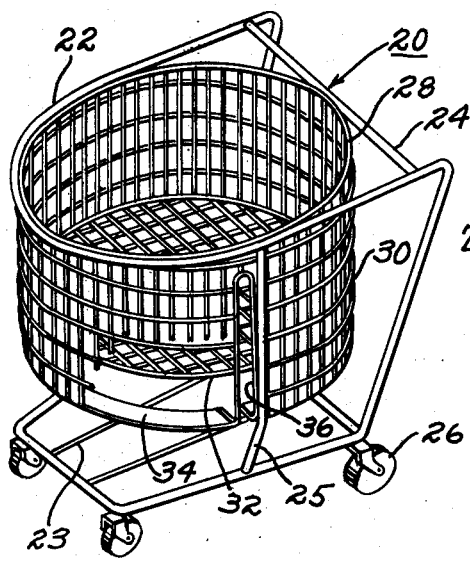
FIG. 4 illustrates a portable cart structure for use in the system of FIG. 1.

The cart 20 illustrated in FIG. 1 is also shown in FIG. 4 and comprises a frame structure 22 of metal tubing or the like formed with a lower platform or shelf 23 for carrying bulky articles, a handle bar 24, and a set of casters or wheels 26 for portability. The frame structure supports a basket 28, preferably circular in shape of a wire mesh, including a cylindrical side wall 30, a bottom wall 32, and an open top. The cylindrical side wall contemplates one that may be tapered as hereinafter disclosed.

The bottom wall 32 is supported to permit relative vertical movement thereof with respect to the side wall 30 in a direction bringing the bottom wall towards and away from the open top, and is also supported to permit relative horizontal rotational movement thereof with respect to the frame structure 22 of the cart. For this purpose, the side wall 30 of the basket terminates at its lower end in an inwardly extending rim 34 upon which the bottom wall 32 may freely rest. Alternatively, the movable bottom wall 32 may rest on a rim extending across a greater area of the wall 32 so as to constitute a permanent bottom having an opening for accommodating the drive mechanism to be described. In addition, one side of side wall 30 is formed with a vertically extending slot 36 also for accommodating the drive mechanism.

Figure 3:
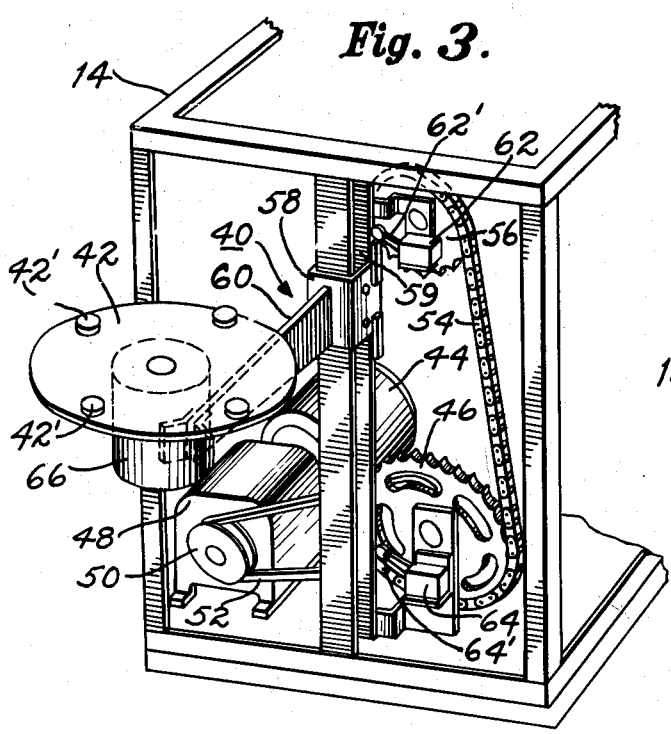
FIG. 3 is a perspective view of the drive means located within the counter for the cart basket or parts thereof.

The drive mechanism generally designated as 40 in FIG. 2 is best illustrated in FIG. 3. Its purpose is to move the bottom 32 of the basket 28 vertically with respect to side wall 30 towards and away from the open top. In this manner, when the portable cart is properly positioned with respect to the counter, the cashier or attendant may empty the cart with greater facility by controlling the drive 40 to continuously or intermittently raise the bottom 32 to bring the basket contents within her reach. As noted above, the bottom 32 is also supported in a manner permitting it to be rotated horizontally with respect to the frame structure. The drive mechanism of FIG. 3 therefore also includes means for rotating the bottom 32 of the basket, thereby further facilitating the emptying of the basket within a relatively narrow reach.

Drive mechanism 40 is enclosed within the stand portion 14 of the counter 10 and drives a disk 42 engageable with the bottom of the basket when the cart is properly positioned. The means for vertically moving the disk 42 comprises a reversible electric motor 44 which drives a sprocket wheel 46 through the medium of a speed-reduction transmission 48, pulley 50, belt 52, and another pulley (not shown) fixed to sprocket 46. The latter sprocket drives an endless chain 54 looped around it and an idler sprocket 56. A mid-portion of the chain 54 between the two sprockets is fixed to a carrier 58 slideably movable on a rail 59 extending the vertical height of the stand 14. The carrier 58 is formed with a bracket arm 60 which supports the disk 42 and thereby moves it upwardly during the forward operation of the motor 44 and downwardly during the reverse operation of the motor.

Figure 5:
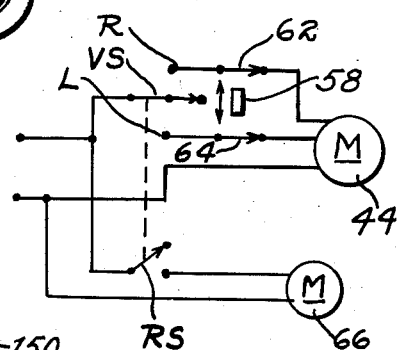
FIG. 5 illustrates an electrical circuit for controlling the drive means in the system described.

The forward and reverse operations of the motor 44 are controlled by any suitable switch, such as a foot-treadle or hip switch, which can be conveniently operated by the checker or cashier. To limit the upward and downward traverse of the drive disk 42 there is provided a pair of limit switches 62, 64, each having an operator 62' and 64', respectively, engageable with an element of the carrier 58 as it reaches its upward and downward limits. A suitable circuit for controlling motor 44 in this manner is illustrated in FIG. 5 and is described later.

The mechanism illustrated in FIG. 3 also includes means for driving the disk 42, and thereby the bottom 32 of the basket, in a horizontal rotational direction. This is accomplished by a separate motor and speed-reduction unit generally designated as 66 contained within the support for disk 42 on the bracket arm 60. This latter drive unit is similarly controlled by any suitable switch conveniently operable by the cashier simultaneously with, or independently of, the operation of the switch for controlling motor 44. The upper surface of disk 42 is preferably roughened or provided with small projections such as bosses 42' for increasing the coupling with the bottom of the basket as it rotates it horizontally.

The drive disk 42 underlies the semi-circular recess 16 of the counter 10 and is normally positioned at its lower extremity so that as the cart is wheeled into the semicircular recess 16 of the counter 10, the disk passes between the bottom 32 of the basket and the lower platform 23 of the cart frame structure. FIG. 2 schematically illustrates this arrangement as it would appear looking downwardly, and also shows how a pair of the counters would be arranged in a market to provide an aisle for the customers and for moving the carts away from the counter after the carts have been emptied. Other arrangements of table 12 and stand 14 could be used with respect to the cart for purposes of positioning and removing the cart, such as receiving it on the side of the table 12 or between table 12 and stand 14.

In operation, the customer wheels the merchandise-loaded cart into the semi-circucular recess 16 of the counter 10, the drive disk 42 being in its lowered position and therefore passing between the bottom of the basket and the platform 23 of the cart frame structure. Any packages that may be carried on platform 23 could not be overlooked by the checker as they would first have to be removed to permit the cart to be moved into its proper position. The proper positioning of the cart is assured by the configuration of the semi-circular portion of the frame structure. Alternatively, the frame structure could include a reinforcing member 25 (see FIG. 4) extending vertically adjacent the slot 36 in the basket side wall to limit on the bracket arm 60 of the drive mechanism. Once the cart is in proper position, the cashier with one hand (left) removes the articles from the cart and places them on the counter 12 as she lists them in the cash register with the other hand (right). By operating the drive mechanism 40 through a foot-treadle or hip switch, the cashier can raise the bottom of the basket, and also rotate it horizontally, so that all articles in the basket will be continuously accessible to her within a relatively narrow area of reach. As the drive disk 42 moves vertically carrying with it the bottom of the basket, its bracket arm 60 is accommodated by vertical slot 36 in the basket. The upward movement of the disk is limited by switch 62 whose operator 62' is engaged by the carrier 58. After the basket has been emptied, the cashier merely reverses the drive motor 44 to return the disk 42 to its normal position where carrier 58 engages operator 64' of lower limit switch 64.

A typical electrical circuit for operating the drive mechanism is shown in FIG. 5. Motor 44 for driving disk 42 in a vertical direction is controlled by a three-position switch VS which may be embodied in a foot-treadle or hip switch for convenient operation by the cashier without the use of her hands. Besides its unconnected neutral contact, it has a contact R for energizing the motor 44 in a "raise" direction, and another contact L for energizing the motor in a "lower" direction. Contact R connects the motor 44 to the line through the upper limit switch 62, and contact L connects the motor to the line through the lower limit switch 64. Both of the limit switches are biased to their closed positions, and are opened when the carrier 58 has moved to either its upper or lower limit wherein it engages operator 62' or 64' to open its respective switch.

Motor 66 for rotating disk 42 in a horizontal plane is controlled by switch RS which may be operated independently of switch VS. Alternatively, for the convenience of the cashier, it may be mechanically connected to switch VS for selective operation simultaneously therewith and/or independently thereof.

While the drive mechanism 40 has been illustrated as being enclosed in the stand 14 portion of the counter, it will, of course, be appreciated that it could as well be incorporated within the flat table 12 portion of the counter. Alternatively, it could be independent of the counter, for example by being a separate unit having the drive disk extending through the floor below the semi-circular recess 16 of the counter or below whatever other means are utilized to position the cart with respect to the counter and the drive mechanism. Also, other drive mechanisms could be used, as for example a rack and pinion arrangement, for moving the bottom of the cart basket.

Figure 6:
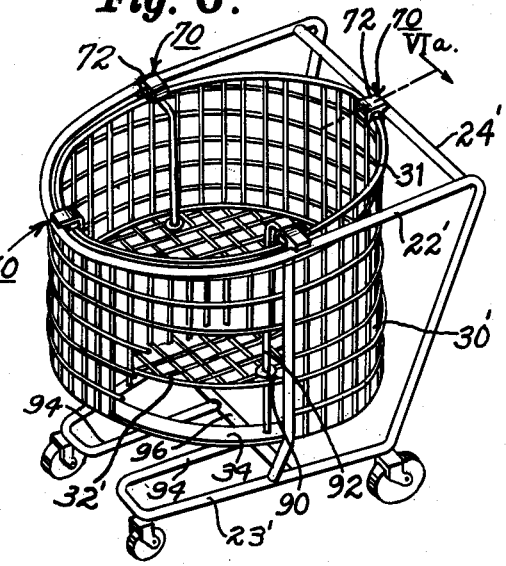
FIG. 6 illustrates a variation of the portable cart structure of FIG. 4.

In the portable carts illustrated in FIGS. 1 and 4, the basket side wall 32 is integrally connected to the cart frame structure 22, so that as the bottom 32 is moved in either the vertical and/or horizontal planes with respect to the frame structure, the basket side wall is prevented from moving therewith and remains stationary with the frame. FIG. 6, however, illustrates a variation of a portable cart wherein the basket side wall 30' is mounted for rotary movement with respect to the frame and is coupled to the bottom wall 32' for rotational movement therewith when the bottom wall is rotated with respect to the frame.

Figure 6A:
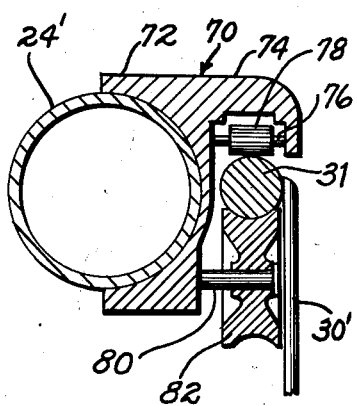
FIG. 6a is an enlarged sectional view taken from FIG. 6 along line VIa thereof.

In the cart of FIG. 6, the basket is supported from the upper portion of the frame structure 22' by a plurality of supporting members 70 (four being shown) which permit the basket as a whole to be rotated in a horizontal plane with respect to the frame. FIG. 6a illustrates a sectional view of the supporting member at the handle 24' portion of the frame structure. As shown, each supporting member 70 includes a collar 72 fixedly secured to the handle 24', as by clamping or welding, the upper portion of the collar 72 being formed with an inwardly extending lip 74 carrying a pin 76 fixed thereto and a roller bearing element 78 rotatably mounted on the pin. The lower portion of the collar 72 carries another pin 80 fixed to the collar, on which pin is journalled a bearing wheel 82. The basket side walls have integrally formed thereon, or fixed thereto as by welding, an outwardly extending bead 31 circumscribing the outer periphery of the basket and which is positioned between bearing element 78 and bearing wheel 82 when the basket is assembled to the cart frame, the pin 80 and bearing 82 being slightly spaced from the basket side wall 30' so as to permit the basket to be rotated in a horizontal plane between bearings 78 and 82. It will, of course, be appreciated that other arrangements could be used for supporting the basket on the frame in a manner that will permit the basket as a whole to be rotated horizontally with respect to the frame.

The cart of FIG. 6 also includes an arrangement for coupling the bottom 32' of the basket with its side wall 30', so that as the bottom is rotated in a horizontal plane, with respect to the frame structure, it will also carry with it the side wall. For this purpose, the bottom 32' is formed with a plurality of apertures 90 along the outer margins thereof, and a strip of metal wire 92 or the like passes through each aperture and is fastened, at one end, to the inwardly extending rim 34 formed at the lower end of the basket side wall, and at the other end, to the bead 31 formed at the upper end of the side wall. The wires 92 are formed parallel to the side walls except at their upper ends where they are bent outwardly for securement to the bead 31. Thus, the bottom 32' of the basket is free to be moved vertically with respect to the side wall, being limited by rim 34 at its lower position and by the bent portions of the wires 92 at its upper position. However any rotational movement of the bottom wall 32' with respect to the frame will also cause the side wall to move therewith as permitted by supporting members 70, whereby the basket as a whole will be rotatable with respect to the frame structure.

Figure 10:
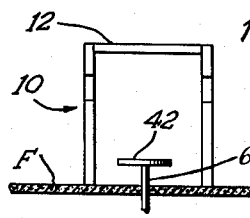
FIG. 10 illustrates a variation of the lift means particularly for use with the cart of FIG. 6.

Since, in the cart embodiment disclosed in FIG. 6 the whole basket is rotatable, the basket side wall 30' is not provided with the vertical slot 36 shown in FIGS. 1 and 4 for accommodating bracket 60 (FIG. 2) of the drive mechanism. In using the FIG. 6 cart, it is preferable that the drive mechanism 40 be arranged so that the disk 42 is supported by a vertical bracket 60' (FIG. 10) projecting through the floor F, so as not to contact or interfere with the rotational movement of the basket side wall. For this purpose, the lower platform 23' of the FIG. 6 frame structure is formed with two legs 94 spaced from each other to accommodate a vertical bracket or support for the disk 42, and also with a cross-bar 96 for engagement with the vertical support for this disk and thereby positioning the cart with respect to the drive mechanism.

In this connection, the motor 66 in the drive mechanism which is used to rotate the bottom of the basket may be dispensed with, since the whole basket is rotatably mounted on the frame structure. Thus, with this arrangement the cashier may find it just as convenient to drive the bottom wall of the basket vertically, but to manually rotate the whole basket in the horizontal plane since very little effort would be required during the latter in view of the bearing means used for supporting the basket on the frame. If such arrangement were to be used, motor 66 could be omitted, and the disk 42 merely mounted on the bracket 60 or its equivalent in a manner permitting free rotational movement thereof.

Figure 7:
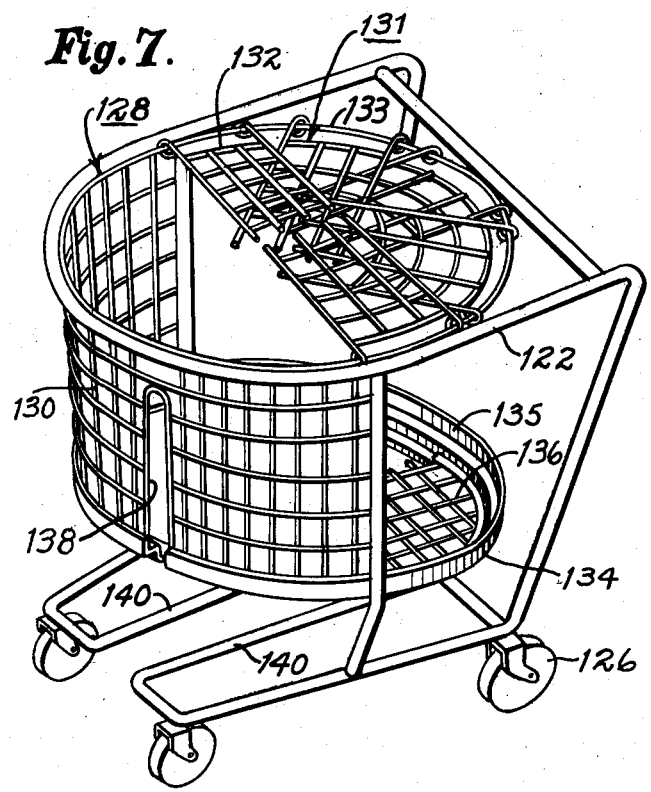
FIGS. 7, 8 and 9 illustrate further variations of portable cart structures, particularly for permitting nesting.
Figure 9:
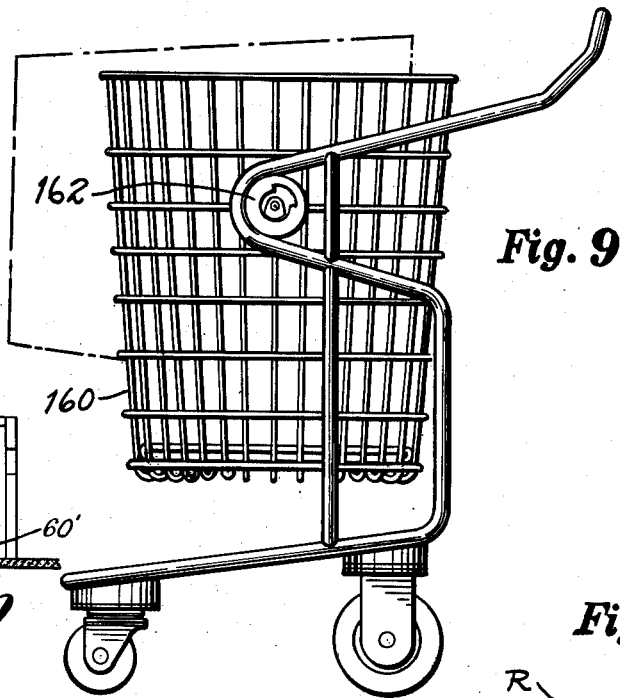
Figure 8:
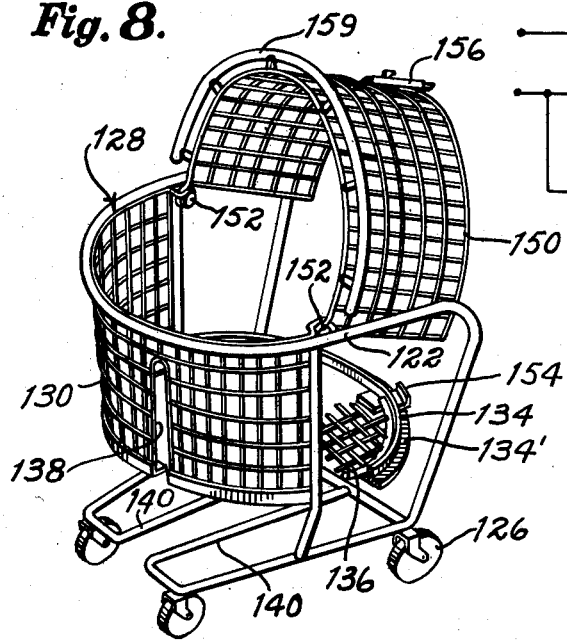

FIGS. 7, 8 and 9 illustrate various portable cart structures to permit nesting of any one cart in other carts of like structure. This is a fairly uniform characteristic of the portable carts used today in food markets in order to conserve floor space in the market while the carts are not being used.

In FIG. 7, the cart illustrated includes the frame structure 122 supported on wheels 126 similar to the carts heretofore described, except that the basket, herein designated as 128, and the frame 122, have been modified to include the nesting feature. Here, the side wall is divided into two parts, one part 130 being fixedly supported in a vertical position, and the other part 131 being made up of a plurality of sections 132 such being pivotally supported from the upper rim 133 of the basket. The lower rim 134 upon which the movable bottom wall 136 normally rests is formed with an upwardly extending border 135 adapted to be engaged by sections 132 when they assume their normal vertical positions while the cart is being used for carrying articles. Thus, in normal use, sections 132 are in their vertical positions against rim 134 and therefore provide, with part 130 of the side wall, a continuous enclosure for the articles. However, when the cart is empty, one cart may be nested with another cart of like structure, whereupon part 130 of the side wall of one cart pushes against, and thereby upwardly pivots, sections 132 of the other cart. When the carts are separated, the sections automatically return to their normal vertical positions against rim 134. It will be appreciated that the bottom wall 136 and the rim 134, as well as the two spaced legs 140, described below, will be tilted downwardly at the portion of the basket underlying the pivotal sections 132 to permit the carts to nest without interference. It will also be appreciated that the cart of FIG. 7 could include the same construction of either FIG. 4 or FIG. 6 for permitting movement of the bottom wall, alone or with the side wall, with respect to the frame structure. Under the FIG. 4 arrangement, rim 134 could be fixedly secured to either the frame and/or the side wall of the basket.

FIG. 7 also illustrates the vertical slot 138, for accommodating the drive mechanism, as being formed in the front of the side wall opposite to the handle for use with a drive mechanism disposed in the table 12 portion of the counter. Also, in FIG. 7 the platform of the cart structure is formed as two spaced legs, 140, should the cart be used with a drive arrangement suggested above in connection with the description of FIG. 6.

FIG. 8 illustrates another variation to permit nesting which is somewhat similar to that shown in FIG. 7, similar parts carrying like reference characters. The primary difference between the carts shown in FIGS. 7 and 8 resides in the structure and operation of the movable part (131 of FIG. 7 and 150 of FIG. 8) of the basket side wall.

In FIG. 8, this movable part is formed as a single section 150 pivotally mounted to a pair of studs 152 formed on the frame structure 122 (or the vertical part 130 of the basket side wall). During use, section 150 of the side wall is pivoted downwardly against rim 134 to form a continuous enclosing surface with vertical part 130 of the side wall. However, when the cart is to be nested with another, section 150 is pivoted 180° so that it lies on top of and in alignment with part 130 thereby forming a semi-circular surface which can be nested. Any suitable means can be used for retaining section 150 in place when it is in its normal downward position, such as a lug 154 formed on the lower rim 134 and a spring latch 156 carried at the lower end of the section 150. That portion of rim 134 underlying section 150 may be provided with a horizontally extending seating surface 134' for section 150. It will also be appreciated that the bottom wall 136, the lower rim 134, and the spaced legs 140 would be likewise tilted, as in FIG. 7, to permit nesting. Preferably, in FIG. 8 the handle bar is omitted for nesting purposes, and the portion of the frame 159 encircling section 150 of the basket is used as the handle.

FIG. 9 illustrates a still further arrangement to permit nesting. Here the basket, generally designated as 160, is pivotally mounted on the frame structure by a pair of pivots 162 (one being shown), enabling the basket to be rotated 90° to occupy the position shown in dotted lines. In addition, the side wall of the basket is tapered, being of greater diameter at the top than at the bottom, so that during non-use of the cart, the basket may be pivoted to the position shown in dotted lines and telescoped in other carts of like structure. Any suitable means could be used for retaining the basket in either of its two positions such as the use of pivots 162 having two-position locking means. Any suitable means could be used for retaining the bottom in place when the basket is pivoted to its nesting position.

For simplification purposes, the structure permitting the bottom wall of the basket to be moved in the manner earlier described has not been shown in detail in the variations of FIGS. 7–9, but it will be appreciated that these carts could utilize the arrangement disclosed in connection with either FIG. 4 or FIG. 6. Also, all the illustrations of the baskets show it made from a wire mesh or the like which in most cases would be preferred, as the baskets would thereby permit more ready viewing of their contents and would prevent an accumulation of foreign matter. However, these disclosures do not foreclose the use of other materials. For example, in the cart disclosed in FIG. 4 it may be preferable to make the basket bottom wall of the wire mesh, and the basket side wall of a material having a smoother surface, such as of a transparent plastic, to prevent any binding or abrading action on the articles of merchandise as they are rotated by and with the bottom of the basket.

While the invention has been described and pointed out in connection with the foregoing disclosure of several preferred embodiments thereof, it is to be understood that, since there are many other variations and modifications thereof which will become apparent to those skilled in the art and since there are many features thereof which could be used with or apart from other disclosed features, the invention itself is not to be limited except as defined in the following claims.

We claim:

1. A check-out system of the character described comprising the combination of a checking counter and portable cart; said counter having a flat table surface for receiving, checking and packaging of articles of merchandise transported thereto by a customer and manually unloaded thereon by an attendant from said portable cart; said cart including a wheeled frame structure and a basket supported thereby for carrying the merchandise; said basket having side wall means, a bottom wall and an open top; said bottom wall being supported to permit relative vertical movement thereof with respect to said frame structure in a direction bringing the bottom wall towards or away from the open top; drive means engageable with said bottom wall for moving same vertically with respect to said frame structure; means engageable with the cart for properly positioning same with respect to said counter to facilitate an attendant's checking and manual unloading of the merchandise onto the counter while the bottom wall of the basket is in engagement with said drive means; and means controllable by the attendant for operating said drive means to bring the bottom wall of said basket towards or away from the open top.

2. A system of the character described comprising a checking counter; a portable cart including a wheeled frame structure and a basket supported thereby for carrying articles, said basket having side wall means, a bottom wall and an open top, said bottom wall being supported to permit relative vertical movement thereof with respect to said side wall means in a direction bringing the bottom wall towards and away from the open top; drive means engageable with said bottom wall for moving same vertically with respect to said side wall means; means engageable with said portable cart for properly positioning same with respect to said drive means and said counter to facilitate an attendant's checking and manual unloading of the merchandise onto the counter while the bottom wall of the basket is in engagement with said driving means; and means controllable by the attendant for operating said drive means to bring the bottom wall of said basket towards or away from the open top.

3. A check-out system of the character described comprising the combination of a checking counter and a portable cart; said counter having a flat table surface for receiving, checking and packaging of articles of merchandise transported thereto by a customer and manually unloaded thereon by an attendant from said portable cart; said cart including a wheeled frame structure and a basket supported thereby for carrying the merchandise; said basket having side wall means, a circular bottom wall and an open top; said circular bottom wall also being supported to permit relative vertical movement thereof with respect to said side wall means in a direction bringing the bottom wall towards or away from the open top; said circular bottom wall also being supported to permit relative horizontal rotational movement with respect to said frame structure; drive means engageable with said bottom wall for moving same vertically with respect to said frame structure; means engageable with the cart for properly positioning same with respect to said counter to facilitate an attendant's checking and manual unloading of the merchandise onto the counter while the bottom wall of the basket is in engagement with said drive means; and means controllable by the attendant for operating said drive means to bring the bottom wall of said basket towards or away from the open top.

4. A system as defined in claim 3 wherein said drive means also includes means for horizontally rotating said bottom wall with respect to said frame structure.

5. A system as defined in claim 3 wherein the bottom wall and the side wall means of said basket are coupled for movement together with respect to said frame structure during horizontal rotational movement of said bottom wall.

6. A system as defined in claim 3 wherein said positioning means comprises an extension of the counter overlying said drive means and configured for the reception of the frame structure of the portable cart.

7. A system as defined in claim 3 wherein said side wall means of said basket forms a substantially cylindrical enclosure terminating at its lower end in an inwardly extending rim, and wherein said circular bottom wall is seated on said rim.

8. A system as defined in claim 3 wherein said side wall means are supported by said cart frame structure so as to be non-rotatable in a horizontal plane.

9. A system as defined in claim 3 wherein said side wall means are rotatably supported on said cart frame structure permitting horizontal rotational movement thereof with respect to said frame structure.

10. A system as defined in claim 9 wherein said side wall means includes guiding means extending from said rim to said open top cooperable with said bottom wall permitting its relative movement towards and away from the open top while coupling same to the side wall means for rotational movement therewith as a unit with respect to said frame structure.

11. A system as defined in claim 10 wherein said guiding means comprises a plurality of wires extending parallel to said side wall means between the rim and the open top thereof and passing through apertures formed in said bottom wall.

References Cited in the file of this patent
UNITED STATES PATENTS

| | | |
|---|---|---|
| 1,227,323 | Russell | May 22, 1917 |
| 1,689,760 | Young et al. | Oct. 30, 1928 |
| 2,605,007 | Gaynor | July 29, 1952 |
| 2,605,116 | Alexander | July 29, 1952 |
| 2,764,420 | Morrissy | Sept. 25, 1956 |
| 2,812,187 | Nicholl et al. | Nov. 5, 1957 |
| 2,884,094 | Roy | Apr. 28, 1959 |
| 2,943,707 | Ramlose | July 5, 1960 |